United States Patent [19]
Desnick et al.

[11] 3,935,881
[45] Feb. 3, 1976

[54] APPARATUS FOR STEADY-STATE VOLUME RATE FLOW CONTROL

[75] Inventors: Mandel L. Desnick, St. Louis Park; Leonard J. Boler, Minneapolis, both of Minn.

[73] Assignee: Cherne Industrial, Inc., Edina, Minn.

[22] Filed: Dec. 3, 1973

[21] Appl. No.: 420,790

[52] U.S. Cl. ............. 137/578; 137/101.27; 73/215
[51] Int. Cl.² ......................................... G01F 11/00
[58] Field of Search ...... 137/578, 577, 579, 101.27, 137/101.29; 73/211, 215, 216, 451, 454, 317

[56] References Cited
UNITED STATES PATENTS

| | | | |
|---|---|---|---|
| 1,108,090 | 8/1914 | Barieau | 137/578 |
| 1,456,743 | 5/1923 | Szabo | 73/317 X |
| 2,116,422 | 5/1938 | Anderson | 137/101.27 |
| 3,031,011 | 4/1962 | Dawson et al. | 137/579 X |
| 3,342,069 | 9/1967 | Brewer | 73/215 |
| 3,593,980 | 7/1971 | McHenry | 267/126 |
| 3,595,269 | 7/1971 | Yeagle | 137/577 |

*Primary Examiner*—William R. Cline
*Attorney, Agent, or Firm*—Dorsey, Marquart, Windhorst, West & Halladay

[57] ABSTRACT

An apparatus for steady-state volume rate flow control from a variable depth liquid having a floating weir assembly of the type with an inlet weir crest over which liquid may flow from said weir crest to a discharge opening through which liquid may flow from said weir. In one form, the weir assembly has a pressure responsive flow control means. When said pressure responsive flow control means is active, said means opposes the buoyancy of said floating weir to position said inlet crest of said weir at a selected distance below the surface of said variable depth liquid independent of the depth of said liquid to establish a steady-state volume rate of liquid flow from said weir. At other times, when said pressure responsive control means is inactive, the buoyancy of said floating weir positions said inlet crest of said weir above the surface of said variable depth liquid independent of the depth of said liquid to establish a zero rate of liquid flow from said weir. A preferred weir assembly has an open-topped circular weir crest, with its circular edge concentric with a first horizontal axis, and with the weir crest supported at one end of a vertically swinging support arm which has its other end arranged for support and swinging movement around a parallel second horizontal axis.

5 Claims, 2 Drawing Figures

APPARATUS FOR STEADY-STATE VOLUME RATE FLOW CONTROL

BACKGROUND OF THE INVENTION

In the field of fluid flow, a weir is any dam or bulkhead over which a fluid may flow, or a bulkhead containing a notch through which a fluid may flow. Generally, a weir is useful for measuring the volume rate of fluid flow. Many types of weirs have been known and used in the past. Such weirs include sharp-crested and flat-crested, rectangular and V-notch, trapezoidal, broad-crested, circular and submerged. Various equations have been derived for the many types of weirs which exist. By measuring the physical characteristics of any particular weir and taking into account various flow impeding factors, it is possible to derive a volume rate of fluid flow equation for such weir. Once such an equation has been derived, it is then possible to use such weir to measure the volume rate of fluid flow by merely measuring the head of fluid over the inlet crest of such weir and placing the value thus obtained into the equation derived for such weir.

While prior art weirs have been found quite useful for measuring the volume rate of fluid flow, such weirs have generally not been suitable for providing and maintaining a selected steady-state volume rate of fluid flow from a variable depth fluid independent of the depth of the fluid. More particularly, prior art weirs have generally been of a fixed type. Accordingly, when the depth of the fluid would increase or decrease, the volume rate of fluid flow would undergo a corresponding increase or decrease. This can readily be understood since an increase or decrease in the depth of the fluid results in a corresponding increase or decrease of the head of fluid over the inlet crest of such fixed weirs. Therefore, while prior art weirs have been well-suited for measuring the volume rate of fluid flow, such weirs have not been suitable for applications which require maintaining a selected steady-state volume rate of fluid flow from a variable depth fluid independent of the depth of the fluid.

Various constant rate pumps have been developed to provide and maintain a selected steady-state volume rate of fluid flow from a variable depth liquid independent of the depth of the fluid. However, for many operations, constant rate pumps are simply not suitable. For instance, such pumps are not suitable for use in sewage treatment facilities since the fluids treated in such facilities are characterized by a presence of suspended solids and such fluids undergo variations in the rate of flow. Constant rate pumps cannot be adjusted to compensate for such variations in the flow rate of suspended solids composed in part of biological colonies called "floc". It is important that these colonies not be broken up. Most pumps, because of their high velocity impellers, will break up the biological floc and, therefore, are not desirable for this application in a sewage treatment facility. Finally, pumps are not suitable due to their high cost. Therefore, alternative means for providing and maintaining a steady-state volume rate of fluid flow for applications such as use in sewage treatment facilities have been sought.

SUMMARY OF THE INVENTION

The present invention is concerned with an improved apparatus for steady-state volume rate flow control from a variable depth liquid independent of the depth of the liquid. The present invention is also concerned with an improved apparatus for steady-state volume flow control which is accurate, reliable and durable for use in corrosive liquids or liquids characterized by a presence of suspended solids. Finally, the present invention is concerned with an improved apparatus for steady-state volume rate flow control which is mechanically simple and inexpensive.

The apparatus for steady-state volume rate flow control consists of a floating weir assembly having an inlet weir crest over which a variable depth liquid may flow when the weir is floated at a predetermined level therein. Also, the floating weir assembly has a discharge opening through which the variable depth liquid may flow from the weir. In one form, the weir assembly has a pressure responsive control means which is operatively connected to oppose the buoyancy of a flotation means which is part of the wier assembly. When the pressure responsive control means is active, the inlet crests of the floating weir can be positioned at a selected distance below the surface of the variable depth liquid independent of the depth of the liquid. In this manner, a selected head of liquid over the inlet crest of the floating wier is provided, and a desired steady-state volume rate of liquid flow is established. The pressure responsive control means maintains a desired pressure downwardly against the buoyancy of the weir throughout a desired range of vertical movement of the weir as the liquid level changes.

In operation, the buoyancy of the floating weir positions the inlet crests above the surface of the variable depth liquid when the pressure responsive control means is inactive. By activating the pressure responsive control means, the inlet crest of the floating weir can be positioned at a selected distance below the surface of the variable depth liquid. The selected distance defines the head of liquid over the inlet crest of the floating weir. The head of liquid over the inlet crest flows to the floating weir and through the discahrge opening from the floating wier. The liquid flow so established is a steady-state volume rate of liquid flow, and the flow remains steady-state independent of the depth of the variable depth liquid. Thus, by utilizing the pressure responsive control means to oppose the buoyancy of the floating weir, an apparatus for steady-state volume rate flow control from a variable depth liquid independent of the depth of the liquid is provided.

A preferred weir assembly has an open-topped circular weir crest, with its circular edge concentric with a first horizontal axis, and with the weir crest supported at one end of a vertically swinging support arm which has its other end arranged for support and swinging movement around a parallel second horizontal axis.

Various other features and object of the invention will be apparent from a consideration of the accompanying specifications, claims and drawings.

DESCRIPTION OF THE PREFERRED EMBODIMENT

Figure 2:
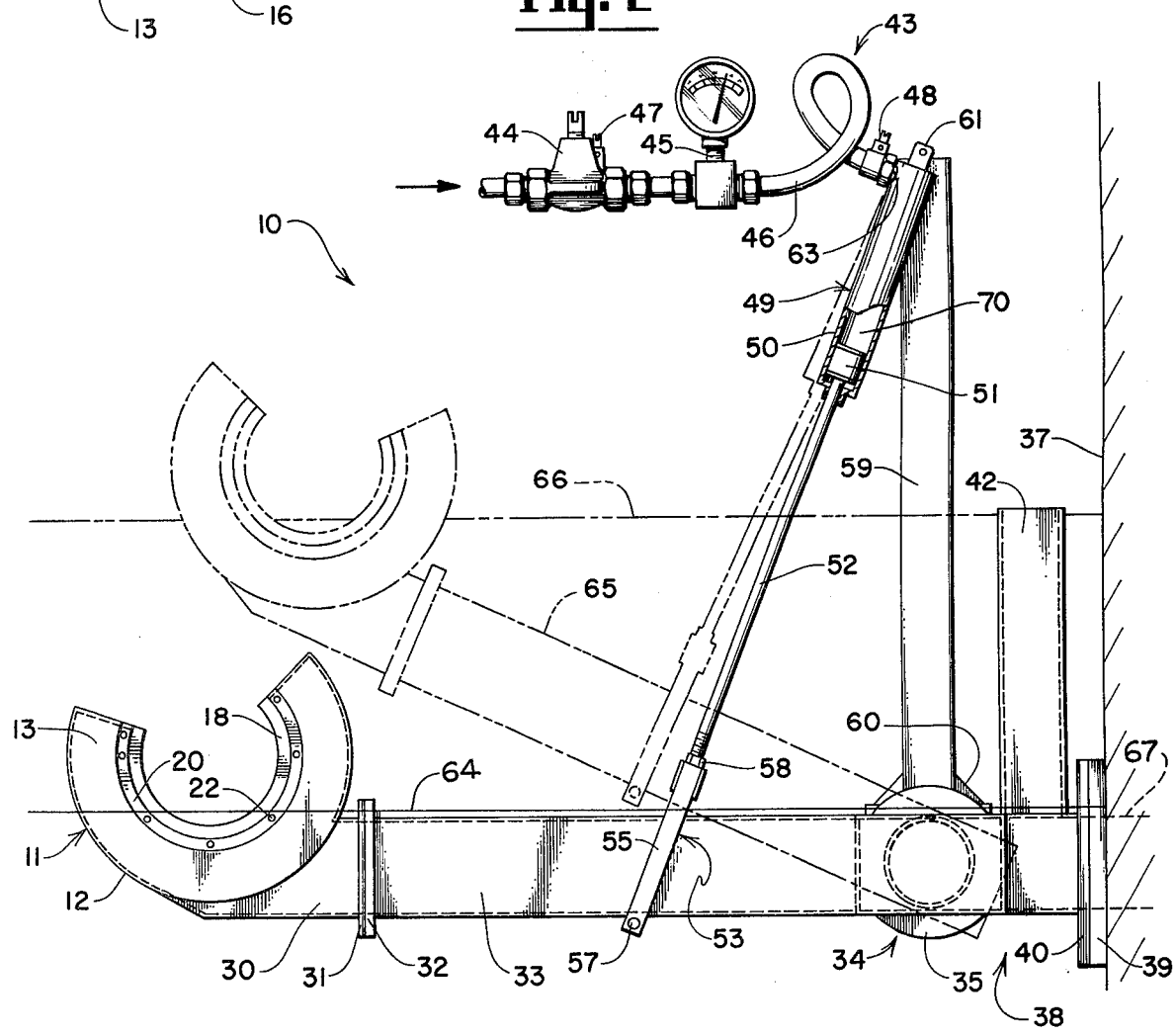
FIG. 2 is a side elevation of an apparatus for steady-state volume rate flow control showing the relation of the floating weir and the pressure responsive control means to a variable depth liquid in both a maximum and a minimum depth position.

Referring to FIG. 2, the apparatus for steady-state volume rate flow control 10 is comprised of floating weir 11 and pressure responsive control means 43. Floating weir 11 has a base and generally C-shaped inlet crests 13 and 14. Generally C-shaped inlet crests 13 and 14 have their open portions upwardly concave and have upper and lower edges which define concentric upwardly concave arcs which are, in the preferred embodiment, circular. Generally C-shaped inlet crests 13 and 14 are substantially parallel and horizontally spaced along a first horizontal axis about which the circular arcs are concentric, and the base defines an upwardly concave arc concentric with the upwardly concave arcs defined by the upper and lower edges of generally C-shaped inlet crests 13 and 14. The manner in which the base is secured to generally C-shaped inlet crests 13 and 14 will be described below.

Figure 1:
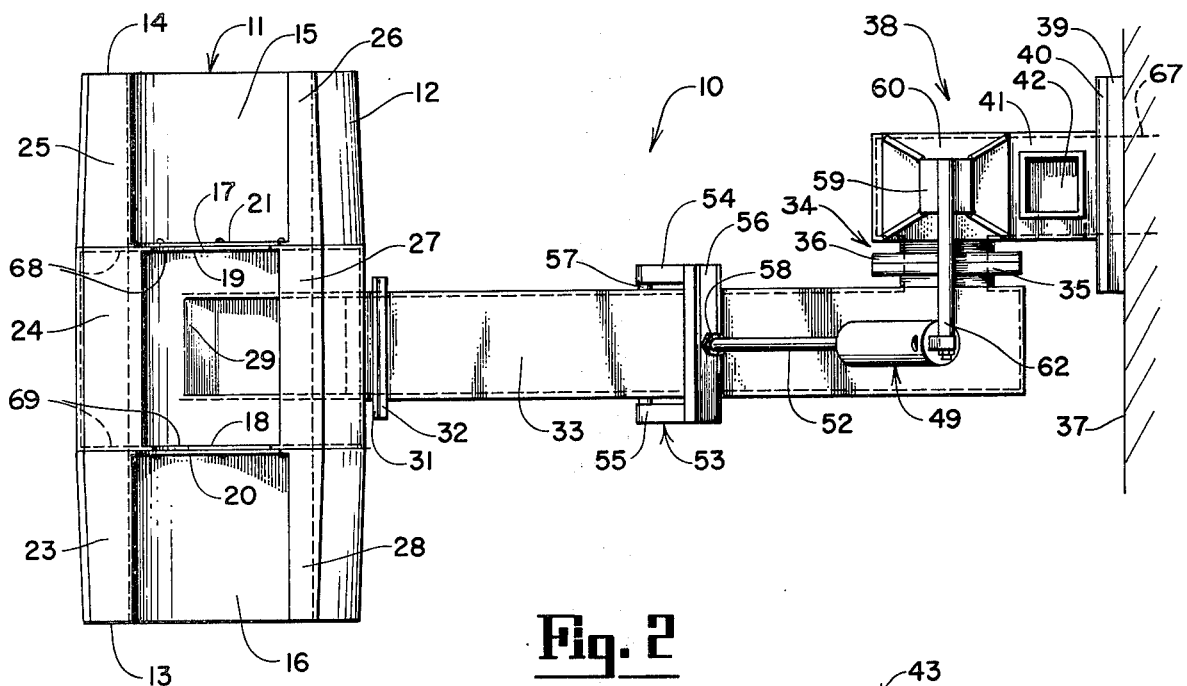
FIG. 1 is a top elevation of an apparatus for steady-state volume rate flow control.

Referring to FIG. 1, floating weir 11 is provided with flotation means. The flotation means includes a circular, concentric flotation chamber to provide a constant buoyant force independent of angular position, and it is preferred to construct floating weir 11 having a flotation chamber in a manner defining discharge opening 17 in the base. As a result, in the preferred embodiment of the present invention, the base of floating weir 11 includes lower surface 12 secured to the lower edges of generally C-shaped inlet crests 13 and 14 and upper surfaces 16 and 15 secured to the upper edges of generally C-shaped inlet crests 13 and 14, respectively. Finally, a series of generally rectangular end surfaces 23, 24, 25, 26, 27 and 28 are provided to complete the construction of floating weir 11 in a manner defining a circular, concentric flotation chamber therein. The flotation chamber so defined, of course, is sealed from communication with discharge opening 17 in the base by generally C-shaaped C-shaped walls 68 and 69 which are substantially identical to generally C-shaped inlet crests 13 and 14 and substantially parallel thereto and horizontally spaced therefrom. Generally C-shaped chamber walls 68 and 69 serve to define discharge opening 17 in the base of floating weir 11 since chamber wall 68 is secured to lower surface 12 and upper surface 15 of the base of floating weir 11, and chamber wall 69 is secured to lower surface 12 and upper surface 16 of the base of floating weir 11. Accordingly, generally C-shaped chamber walls 68 and 69 serve to seal discharge opening 17 so defined from communication with the flotation chamber.

In the preferred embodiment of floating weir 11, lower surface 12, upper surfaces 15 and 16, generally C-shaped inlet crests 13 and 14, end surfaces 23, 24, 25, 26, 27 and 28, and generally C-shaped chamber walls 68 and 69 are constructed of molded polyvinylchloride, and the flotation chamber of floating weir 11 so defined is filled with polyurethane foam for better flotation. Of course, the polyvinylchloride is used for the construction of floating weir 11 to provide a material of high durability which is not affected by corrosive liquids or the presence of suspended solids. Furthermore, a material such as polyvinylchloride makes it possible to provide a floating weir 11 characterized by a simple, integrally molded construction which is inexpensive to manufacture.

Other features of the floating weir assembly include molded flanges 20 and 21. As with the other portions of the construction of floating weir 11, molded flanges 20 and 21 are also preferably constructed of integrally molded polyvinylchloride. Secured to molded flanges 20 and 21 by rivets 22 are weir rims 18 and 19, respectively. Weir rims 18 and 19 are preferably of corrosion-resistant materials. When pressure responsive control means 43 is active and generally C-shaped inlet crests 13 and 14 weir rims 18 and 19 are positioned at a selected distance below the surface of the variable depth liquid, an apparatus of a highly durable construction which is resistant to corrosive liquids or the presence of suspended solids is provided.

Discharge opening 17 in the base of floating weir 11 is formed with discharge adapter opening 29 therein. Discharge adapter opening 29 is provided in lower surface 12 of the base of floating weir 11, and, referring to FIG. 1, it can be seen that discharge opening 17 communicates directly with discharge adapter opening 29. Discharge adapter tube 30 is secured to the lower surface 12 of the base of floating weir 11 in communication with discharge adapter opening 29. Thus, any liquid flowing over generally C-shaped inlet crests 13 and 14 and weir rims 18 and 19 of floating weir 11 flows, in turn, through discharge opening 17 and discharge adapter opening 29 in the base of floating weir 11 into discharge adapter tube 30.

As previously noted, one end of discharge adapter tube 30 communicates with discharge adapter opening 29. The opposite end of discharge adapter tube 30 is provided with discharge adapter tube collar 31. In addition, pivotally mounted discharge tube 33 is provided with pivoting discharge tube collar 32 at one end. Discharge adapter tube collar 31 can be removably engaged with pivoting discharge tube collar 32. Thus, should it become desirable to replace floating weir 11 of apparatus 10, such operation can easily be accomplished by simply removing discharge adapter tube collar 31 from engagement with pivoting discharge tube collar 32. In this manner, floating weir 11 and discharge adapter tube 30 can be removed from other portions of apparatus 10 for repair or replacement with a minimum of effort at any desired time. Discharge adapter tube collar 31 and pivoting discharge tube collar 32 simply eliminate the necessity of removing the entire apparatus 10 to perform such functions.

Referring to FIG. 1, discharge tube 33 is pivotally mounted to apparatus support means 38 by pivotal connection means. More particularly, pivotal connection means for pivotally mounting discharge tube 33 to apparatus support means 38 includes pivotal shoulder 34. Pivotal shoulder 34 is comprised of fixed shoulder portion 36 and pivotal shoulder portion 35, both of which lie on a second horizontal axis spaced from and parallel to the first horizontal axis of the generally C-shaped inlet crests 13 and 14. Fixed shoulder portion 36 is rigidly mounted to apparatus support means 38 and pivotal shoulder portion 35 is pivotally mounted to fixed shoulder portion 36 of pivotal shoulder 34 and rigidly mounted to pivotally mounted discharge tube 33. Thus, since pivotal shoulder portion 35 is pivotally mounted to fixed shoulder portion 36, floating weir 11, discharge adapter tube 30 and pivotally mounted discharge tube 33 are free to pivot about fixed shoulder portion 36. Finally, fixed shoulder portion 36 and pivotal shoulder portion 35 are adapted to facilitate communication of pivotally mounted discharge tube 33 through pivotal shoulder 34 to apparatus support means 38 and external receiver means 67, as will be more fully understood below. Other pivotal connections and joints, with or without seals, may be used.

Apparatus support means 38 rigidly supports floating weir 11, discharge adapter tube 30 and pivotally mounted discharge tube 33 with respect to a variable depth liquid. Apparatus support means 38 is comprised of wall support collar 39 rigidly mounted to wall 37, apparatus support collar 40 removably engaged with wall support collar 39 and fixed discharge tube 41 secured to and extending from apparatus support collar 40. Fixed discharge tube 41 communicates with external receiver means 67 through apparatus support collar 40 and wall support collar 39. Finally, fixed shoulder portion 36 of pivotal shoulder 34 is rigidly mounted to fixed discharge tube 41 of apparatus support means 38. Thus, a variable depth liquid may flow over generally C-shaped inlet crests 13 and 14 and weir rims 18 and 19 through discharge opening 17 and discharge adapter opening 29 in the base of floating weir 11, along discharge adapter tube 30 and pivotally mounted discharge tube 33 into fixed discharge tube 41, and finally, into external receiver means 67. The precise operation of the present invention will be more fully understoood below.

Referring to FIG. 2, pressure responsive control means 43 can be understood. In the preferred embodiment, pressure responsive control means 43 includes pressure regulator 44 to receive pressure from an external pressure source and pressure bleed 47. Pressure regulator 44 and pressure bleed 47 communicate with pressure gauge 45, flexible pressure line 46 and pressure port 63. In this manner, pressure from the external pressure source passes through pressure regulator 44, pressure gauge 45, flexible pressure line 46, pressure port 63 and into air cylinder 49. Of course, other pressure responsive control means such as a hydraulic cylinder can also be utilized. A pressure control bleed 48 is provided immediately adjacent pressure port 63 in flexible pressure line 46. The precise function of pressure control bleed 48 will be described below.

Air cylinder 49 of pressure responsive control means 43 is comprised of cylinder 50 and piston 51 which define pressure chamber 70. Rigidly mounted to piston 51 is connecting rod 52 provided to oppose the buoyancy of floating weir 11. In the preferred embodiment, connecting rod 52 is operatively connected to pivotally mounted discharge tube 33 by means of positioning bracket 53. Positioning bracket 53 is comprised of horizontal support pin 57 which is rigidly mounted to pivotally mounted discharge tube 33, substantially vertical pivoting support members 54 and 55 which are pivotally mounted to horizontal support pin 57 at their lower ends, and horizontal support member 56 which is rigidly mounted to substantially vertical pivoting support members 54 and 55 at their upper ends. Intermediate the length of horizontal support member 56 is internally threaded nut 58 rigidly secured thereto, and connecting rod 52 of pressure responsive control means 43 is threaded at its lower end and is operatively connected to positioning bracket 53 by being threadedly engaged with internally threaded nut 58 thereof.

Referring to FIG. 2, vertical support column 59 is provided to support pressure responsive control means 43. More particularly, vertical support column 59 is mounted on support column base 60. Suppport column base 60, in turn, is mounted on fixed discharge tube 41 of apparatus support means 38. In this manner, vertical support column 59 is secured to and extends upward from apparatus support means 38 and pivot arm 62, as shown in FIG. 1, extends horizontally from the upper end of vertical support column 59 to pivotally support pressure responsive control means 43. Air cylinder mounting bracket 61, which is integral with the upper end of air cylinder 49 of pressusre responsive control means 43, is pivotally mounted on pivot arm 62. Accordingly, air cylinder 49 is pivotally mounted to pivot arm 62.

Air cylinder 49 applies a constant force when the pressure directed thereto is constant. However, the torque on the portion of apparatus 10 comprised of floating weir 11, discharge adapter tube 30 and pivotally mounted discharge tube 33 varies with the angle of application of the force applied by air cylinder 49. But the effective weight of the liquid in the portion of apparatus 11 compound of these elements also varies with the angle of these elements. Thus, the precise geometrical relationship between the air cylinder 49 and the portion of apparatus 10 comprised of floating weir 11, discharge adapter tube 30 and pivotally mounted discharge tube 33 is chosen to compensate for the variation in effective weight of the liquid with change in regular position.

Finally, overflow tube 42 is provided. Overflow tube 42 is mounted to communicate with fixed discharge tube 41 and extends upward therefrom. Overflow tube 42 is provided so that the variable depth liquid can never reach a greater depth than the maximum desired depth. The length of overflow tube 42, of course, is dependent upon the maximum desired depth for the variable depth liquid. Under normal conditions, floating weir 11, discharge adapter tube 30 and pivotally mounted discharge tube 33 serve to provide a steady-state volume rate of flow from a variable depth liquid independent of the depth of the liquid to external receiver means 67. However, in some applications it may be necessary to prohibit the variable depth liquid from reaching a greater depth than the maximum desired depth. Thus, when the variable depth liquid reaches the maximum desired depth, such liquid will be drawn off by both floating weir 11 and oveflow tube 42 to external receiver means 67 to assure that such variable depth liquid does not reach a greater depth than the maximum desired depth.

The present invention is particularly well adapted for use in sewage treatment facilities. In such facilities, sewage undergoes an initial treatment such as aeration in a channel provided for such purpose. However, sewage is received in aeration channels at non-uniform rates. More particularly, it is well-known that sewage is received by sewage treatment facilities at a high rate during peak flow periods and at a low rate during other periods. Thus, the depth of sewage in the aeration channels is variable. While such a variation in the depth of sewage in the aeration channels is acceptable, it is generally desirable for the final sedimentation tanks to receive only a uniform flow of aerated liquid. As a result, it is necessary to provide means by which aerated liquid may be removed from the aeration channels to the final sedimentation tanks at a steady-state volume rate of flow from the variable depth liquid independent of the depth of the liquid.

The present invention allows a sewage treatment facility to be operated by making a simple setting of the desired flow rate. The flow rate reaching the final sedimentation tanks remains uniform unless the aeration channels reach a greater depth than the maximum desired depth. When this occurs, the overflow tube, set at such level, carries the excessive flow directly from the aeration channel to the final sedimentation tanks. The overflow tube assures that the sewage within the aeration channel will not overflow onto the adjacent landscape.

When the apparatus for steady-state volume rate flow control is provided for use in sewage treatment facilities, it is normally mounted in a chamber adjacent to the channel aeration facility and directs a steady-state volume rate of flow from the variable depth liquid independent of the depth of the liquid to a bio-solids separation unit or final sedimentation tank. The distance which the generally C-shaped inlet crests and weir rims of the floating weir are positioned below the surface of the liquid, and thus the volume rate of flow is adjustable by means of a remote control panel including a calibrated, adjustable pressure regulator for infinitely variable adjustment. The pressure regulator directs pressure from an external pressure source to the air cylinder calibrated to correspond with expected sewage treatment facility flows.

In operation, the apparatus for steady-state volume rate flow control 10 is an integral unit mounted on wall 37 in communication with external receiver means 67. External receiver means 67 and apparatus support means 38 are mounted at a minimum depth from which it is desired to remove liquid from the variable depth liquid. Such minimum depth is represented by surface level 64 of the variable depth liquid. When the variable depth is in this position, floating weir 11, discharge adapter tube 30 and pivotally mounted discharge tube 33 are substantially horizontal. If the variable depth liquid should have a lower surface level, the apparatus 10 would have a zero volume rate of liquid flow. Since the floating weir 11, discharge adapter tube 30 and pivotally mounted discharge tube 33 would be positioned lower than the external receiver means 67, this result necessarily follows.

When the variable depth liquid is at greater than the minimum desired depth represented by surface level 64, pressure from the external pressure source can be directed to pressure regulator 44. Such pressure is, in turn, passed through pressure gauge 45 and flexible pressure line 46 from which it is directed to air cylinder 49 through pressure port 63. Pressure regulator 44 can be caliberated so that various settings will reflect various volume rates of liquid flow. When pressure regulator 44 is placed in a particular setting, the pressure directed through pressure port 63 forces piston 51 downward in cylinder 50 to define pressure chamber 70. Piston 51, in turn, forces connecting rod 52 downward. Since connecting rod 52 is threadedly engaged with positioning bracket 53 mounted on pivotally mounted discharge tube 33, the portion of apparatus 10 comprised of floating weir 11, discharge adapter tube 30 and pivotally mounted discharge tube 33 is pivoted downward by such pressure about pivotal shoulder 34. The downward pivoting force opposes the buoyancy of the floating weir box, including a crest, a discharge opening and flotation, to position generally C-shaped inlet crests 13 and 14 and wier rims 18 and 19 at a selected distance below the surface of the variable depth liquid. This, in turn, establishes desired steady-state volume rate of liquid flow through discharge opening 17 and ultimately to external receiver means 67. The volume rate of flow will be defined by the head of liquid over generally C-shaped inlet crests 13 and 14 and weir rims 18 and 19 of floating weir 11.

Referring to FIG. 2, surface level 64 and generally C-shaped inlet crests 13 and 14 and weir rims 18 and 19 define a cross-section of liquid in the form of a circular arc. Also, since generally C-shaped inlet crests 13 and 14 have their open portions upwardly concave and have upper edges defining upwardly concave circular arcs, the cross-section of liquid over generally C-shaped inlet crests 13 and 14 and weir rims 18 and 19 remains in the form of a circular arc independent of the pivoting of the portion of apparatus 10 comprised of floating weir 11, discharge adapter tube 30 and pivotally mounted discharge tube 3 about pivotal shoulder 34. Furthermore, the head of liquid in the cross-section in the form of a circular arc over generally C-shaped inlet crests 13 and 14 and weir rims 18 and 19 remains constant independent of the pivoting of the portion of apparatus 10 comprised of these elements when pressure regulator 44 is placed in a particular setting.

These features of the present invention can be understood by referring to FIG. 2 where the portion of apparatus 10 comprised of floating weir 11, discharge adapter tube 30 and pivotally mounted discharge tube 33 is shown in a variable depth liquid at a minimum depth, represented by surface level 64. These features can further be understood by referring to FIG. 2 where the portion of apparatus 10 comprised of these elements is shown in phantom lines, represented by reference numeral 65, in a variable depth liquid at a maximum depth, represented by surface level 66. As shown in FIG. 2, when pressure regulator 44 is placed in a particular setting, the cross-section of liquid over generally C-shaped inlet crests 13 and 14 and weir rims 18 and 19 remains in the form of a circular arc and the head of liquid in the cross-section remains constant independent of the pivoting of the portion of apparatus 10 comprised of floating weir 11, discharge adapter tube 30 and pivotally mounted discharge tube 33 about pivotal shoulder 34. As a result, as the depth of liquid in the variable depth liquid changes, for instance, from a minimum desired depth to a maximum desired depth with pressure regulator 44 placed in a particular setting, the buoyancy of floating wier 11 forces connecting rod 52 and piston 51 upward into cylinder 50. Pressure control bleed 48 and pressure bleed 47 serve to quickly relieve the increasing pressure in pressure chamber 70 caused by the decreasing volume of pressure chamber 70 and serve to quickly stabilize the pressure in pressure chamber 70 at the desired setting. Accordingly, as the liquid in the variable depth liquid rises and as floating weir 11, discharge adapter tube 30 and pivotally mounted discharge tube 33 pivot upward about pivotal shoulder 34, the cross-section and head of liquid over generally C-shaped inlet crests 13 and 14 and weir rims 18 and 119 remain substantially the same. This result follows, of course, because the downward force of pressure responsive control means 43 opposing the buoyancy of floating weir 11 remains substantially the same.

As the depth of liquid in the variable depth liquid changes, for instance, from a maximum depth to a minimum depth, the cross-section and head of liquid over generally C-shaped inlet crests 13 and 14 and weir rims 18 and 19 remain substantially the same in a similar manner with piston 51 and connecting rod forced downward in cylinder 50. Pressure regulator 44 serves to quickly supply pressure to pressure chamber 70 where the pressure is decreasing because of the increasing volume of pressure chamber 70 and serves to quickly stabilize the pressure in pressure chamber 70 at the desired setting. Therefor, as the variable depth liquid undergoes any change in depth, either increasing or decreasing between a minimum desired depth and a maximum desired depth, the apparatus for steady-state volume rate flow control from a variable depth liquid provides a desired steady-state volume rate of liquid flow independent of the depth of the liquid.

In order to calibrate pressure regulator 44, various equations have been developed for weirs of various shapes. Thus, an equation which has been developed for a head of liquid over a circular arc inlet crest can be used to calibrate pressure regulator 44. In the alternative, at various pressure settings, the volume rate of flow can be measured experimentally and calibration can be accomplished in this manner. In any event, with the external pressure source supplying pressure to pressure regulator 44 which is placed in a desired setting, a desired steady-state volume rate of liquid flow is established.

Referring to FIG. 2, the variable depth liquid represented by surface level 66 is at a maximum depth in such position. If additional liquid should be introduced, such liquid would be drawn off into external receiver means 67 by overflow tube 42. Of course, liquid would continue to flow through discharge opening 17 and ultimately into external receiver means 67 as well. However, in order to assure that the variable depth liquid does not reach a depth greater than the maximum desired depth, the flow through external receiver means 67 would no longer be a steady-state flow. On the other hand, once the variable depth liquid returns to a depth between its maximum desired depth and its minimum desired depth, as represented by liquid surfaces 66 and 65, respectively, a steady-state volume rate of liquid flow will once again be provided since there will be no liquid through overflow tube 42.

When it is desired to increase or decrease the volume rate of liquid flow, it is simply necessary to adjust the pressure regulator 44 to a pressure setting corresponding to the desired rate of liquid flow. When it is desired to increase the volume rate of liquid flow, the pressure is increased thereby quickly forcing piston 51 downward in cylinder 50. By forcing piston 51 downward, connecting rod 52 forces positioning bracket 53 downward as well. This, in turn, forces pivotally mounted discharge tube 53, discharge adapter tube 30 and floating weir 11 to be pivoted downward about pivotal shoulder 34. As a result, generally C-shaped inlet crests 13 and 14 and weir rims 18 and 19 are positioned at a greater distance below the surface of the variable depth liquid. In this manner, an increased steady-state volume rate of liquid flow is quickly established since the head of liquid over generally C-shaped inlet crests 13 and 14 and weir rims 18 and 19 is greater. Of course, to decrease the steady-state volume rate of liquid flow, the pressure is reduced and piston 51 is forced upward into cylinder 50 by the buoyancy of floating wier 11. Once again, air cylinder 49 responds quickly by reason of pressure bleed 47 and pressure control bleed 48. Since piston 51 is moved upward into cylinder 50, pressure responsive control means 43 provides a lesser force opposing the buoyancy of the floating weir 11, thus reducing the head of liquid flow. This, of course, quickly establishes a decreased steady-state volume rate of liquid flow.

If it becomes necessary during operation of the apparatus 10 to entirely stop the liquid flow, such liquid flow can be quickly stopped by simply setting pressure regulator 44 in an "off" position so that no pressure is supplied to air cylinder 49. With no pressure supplied to air cylinder 49, piston 51 is forced upward into cylinder 50 by the buoyancy of floating weir 11. With pressure regulator 44 in an "off" position, piston 51 is quickly forced upward into cylinder 50 to a position in which generally C-shaped inlet crests 13 and 14 and weir rims 18 and 19 of floating weir 11 are positioned entirely above the surface of the variable depth liquid by the buoyancy of floating weir 11. The responsivenss of piston 51 to the buoyancy of floating weir 11 is facilitated by pressure bleed 47 and pressure control bleed 48. Thus, a zero volume rate of liquid flow will quickly be established when pressure responsive control means 43 is inactive.

With the present invention, an apparatus for steady-state volume rate flow control from a variable depth liquid is provided. The apparatus, except as set forth above, is constructed of materials having a corrosion-resistant finish. Accordingly, with the present invention, an apparatus for steady-state volume rate flow control which is accurate, reliable and durable for use in corrosive liquids characterized by a presence of suspended solids is provided. Finally, an apparatus for steady-state volume rate flow control which is mechanically simple and inexpensive is provided.

While the present application has shown a specific embodiment of the apparatus for steady-state volume rate flow control from a variable depth liquid for purposes of illustration only, it is to be understood that the invention is to be limited solely by the scope of the appended claims.

We claim:
1. An apparatus for steady-state volume rate flow control from a variable depth liquid which comprises:
  a floating weir having an inlet crest over which such liquid may flow when said weir is floated at a predetermined level therein and a discharge opening through which such liquid may flow from said weir; and
  pressure responsive control means operatively connected to said floating weir for opposing the buoyancy of said weir to position said inlet crest of said weir at a selected distance below the surface of said variable depth liquid, thereby establishing a desired steady-state volume rate of liquid flow from said weir through said discharge opening.
  said pressure responsive control means including an air cylinder member, a piston member relatively movable therein along an axis having a substantial vertical component and defining a pressure chamber therein, one of said piston and cylinder members operatively connected to said weir and the other of said piston and cylinder members having means for connection to a support, and means for applying pressure to said pressure chamber from an external pressure source,
  said means for applying pressure to said pressure chamber from an external source including a pressure port communicating with said pressure chamber, a pressure regulator communicating with said pressure port for controlling the pressure applied to said pressure chamber, and a pressure control bleed for controlling the pressure in said pressure chamber independent of relative movement of said piston member in said cylinder member.

2. An apparatus for steady-state volume rate flow control from a variable depth liquid which comprises:
a floating weir having an inlet crest over which such liquid may flow when said weir is floated at a predetermined level therein and a discharge opening which communicates with an external receiver means and through which such liquid may flow from said weir,
said apparatus including a discharge tube having a first end and a secnd end, said first end communicating with said discharge opening and said second end communicating with said external receiver means.
said apparatus also including an apparatus support means and wherein said second end of said discharge tube is pivotally mounted to said apparatus support means, and
pressure responsive control means operatively connected to said floating weir for opposing the buoyancy of said weir to position said inlet crest of said weir at a slected distance below the surface of said variable depth liquid, thereby establishing a desired steady-state volume rate of liquid flow from said weir through said discharge opening,
said floating weir having two substantially parallel and horizontally spaced generally C-shaped inlet crests, each having its open portion upwardly concave and wherein an upper edge and a lower edge of each generally C-shaped inlet crest define concentric, upwardly concave arcs, and wherein said floating weir has a base secured to said lower edges of said generally C-shaped inlet crests, said base defining an upwardly concave arc concentric with said upwardly concave arcs defined by said upper edges of said generally C-shaped inlet crests and concentric and coincident with said upwardly concave arcs defined by said lower edges of said generally C-shaped inlet crests.

3. The apparatus of claim 2 wherein said discharge opening of said floating weir is located in said base thereof.

4. The apparatus of claim 3 wherein floating weir includes flotation means.

5. The apparatus of claim 4 wherein said flotation means includes a flotation chamber and wherein said base of said floating weir has a lower surface secured to said lower edges of said generally C-shaped inlet crests and wherein said base has an upper surface secured to said upper edges of said generally C-shaped inlet crests, said lower surface defining an upwardly concave arc concentric and coincident with said upwardly concave arcs defined by said lower edges and said upper surface defining an upwardly concave arc concentric and coincident with said upwardly concave arcs defined by said upper edges, said upper and lower surfaces of said base and said inlet crests forming said flotation chamber.

\* \* \* \* \*